United States Patent [19]
Payne

[11] Patent Number: 5,423,290
[45] Date of Patent: Jun. 13, 1995

[54] PARAKEET NESTING FACILITY AND AMUSEMENT DEVICE

[76] Inventor: Wesley T. Payne, 1239 Cottonwood Dr., Oceanside, Calif. 92056

[21] Appl. No.: 206,949

[22] Filed: Mar. 7, 1994

[51] Int. Cl.⁶ .............................................. A01K 31/14
[52] U.S. Cl. ..................................... 119/45.1; 119/23; 119/702
[58] Field of Search .............. 119/23, 18, 45.1, 51.03, 119/57.8, 707, 708, 15, 702

[56] References Cited

U.S. PATENT DOCUMENTS

| | | | |
|---|---|---|---|
| 1,230,780 | 6/1917 | Reiber | 119/23 |
| 3,646,911 | 3/1972 | Parson | 119/57.8 |
| 3,848,570 | 11/1974 | Seigliano | 119/51.03 |
| 4,576,116 | 3/1986 | Binkert | 119/708 |
| 5,165,363 | 11/1992 | McGinty | 119/57.8 |
| 5,289,795 | 3/1994 | Mohilef | 4/1992 |

FOREIGN PATENT DOCUMENTS

| | | | |
|---|---|---|---|
| 135280 | 11/1949 | Australia | 119/57.8 |
| 949406 | 6/1974 | Canada | 119/23 |
| 1676551 | 9/1991 | U.S.S.R. | 119/45.1 |

*Primary Examiner*—Todd E. Manahan
*Attorney, Agent, or Firm*—Ralph S. Branscomb

[57] ABSTRACT

A nesting facility designed specifically for parakeets but possibly being adaptable for other birds comprises an elongated tree-like length which is solid throughout, having a hard cylindrical wall and a soft inside that can be pecked out by the bird to satisfy its pecking instincts and to form a nest of the torn off bits of pith. A hole through the cylindrical sidewall provides the bird access to the pithy interior, which has a texture at the bird enjoys pulling out and reworking into a padded nest over a period of weeks or months.

5 Claims, 1 Drawing Sheet

U.S. Patent   June 13, 1995   5,423,290
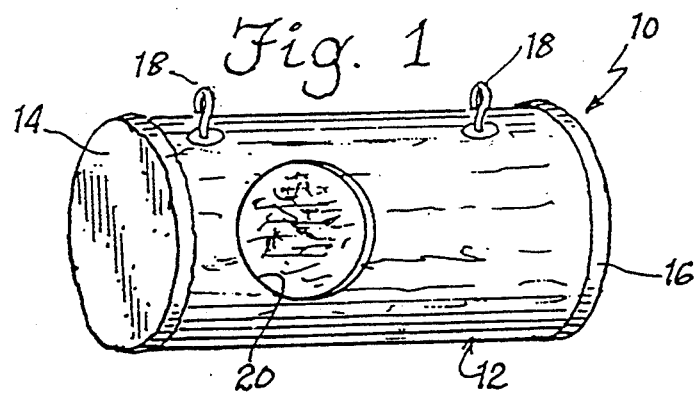
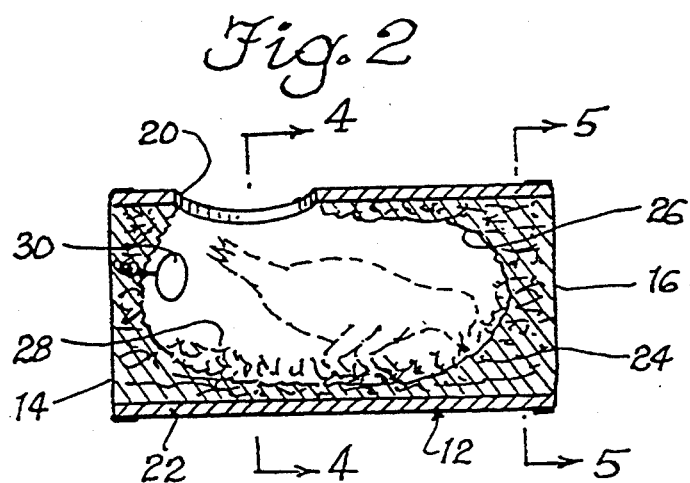
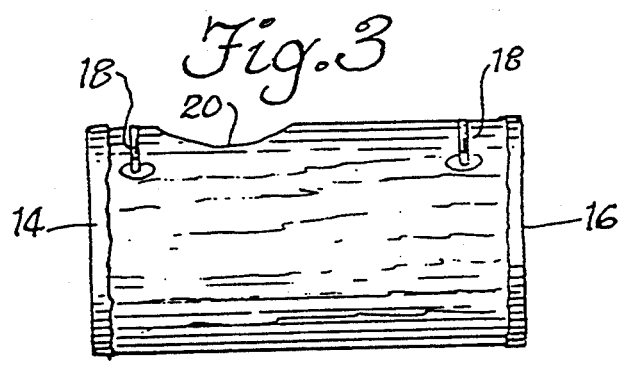
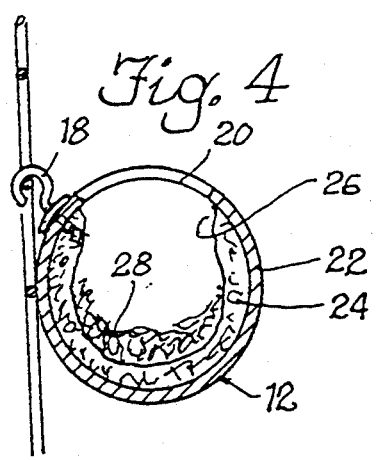
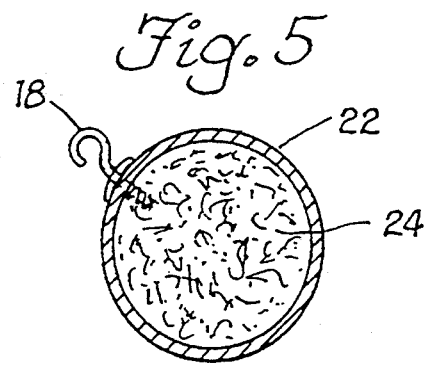

PARAKEET NESTING FACILITY AND AMUSEMENT DEVICE

BACKGROUND OF THE INVENTION

Studies have shown that birds have emotional structures much like man and the higher animals. Anyone who has lived with a bird or had a bird for a pet can attest to this. A bird in a bad mood will peck at the owner for example, when hours earlier it would be rubbing up against the owner and taking food from him. When a bird's mate disappears, the remaining bird is visibly despondent and nervous for a period of days or even weeks much as a human would be.

Even though birds are not too bright, they nonetheless need mental stimulation, or at least seek it. In a parakeet cage, there is very little in the way of resource material for avian mental stimulation. The bird bores quickly with reading the newspaper lining the bottom of the cage unless it is one he has not yet read. In the wild the bird has plenty of excitement and entertainment, much of it being "Camino Real" in form in which the bird is flying for its life. Nonetheless, it is exciting and mentally stimulating, provided the bird does not wind up as meal for a cat.

Obviously parakeets cannot duplicate the wild freedom of the outdoors inside a parakeet cage. There are few projects to be done in a cage, and even fewer that interest the parakeet. Aside from the wood shavings, a little bird seed scattered about and a water feeding tray there is nothing for the parakeet to amuse itself with other than its chirping. It hasn't even thumbs to twiddle.

There are toys available for birds, but generally speaking they are not particularly well received by the bird inasmuch as they were conceived more by humans who fail to truely understand the bird brain. The bird will not like the blue rubber mouse that its owner thinks is se cute.

Thus faced with the communication gap between bird and owner, and the inability of the bird to provide mental stimulation for itself, the bird is doomed to spend its life with an increasingly dwindling mental capacity which, at its peak capacity, was still only a bird brain.

There is a crying need therefore, for projects which can be entertaining and stimulating to a being that has no hands or arms and cannot speak or comprehend the spoken word, a challenge to amuse what for present purposes amounts to little more than a walking beak.

SUMMARY OF THE INVENTION

The instant invention provides such stimulation by taking advantage of the fact that the walking beak at least has legs that will walk and a beak that will peck. The invention makes available to the parakeet a nesting log similar to certain trees in the wild which the birds have been known to peck out. The bud or flower stalk of the Agave Americanus plant for example, also known as the "Century" plant, has the required differentiation of textures. These textures comprise a hard but relatively thin outer shell somewhat like a coconut shell which is filled with pithy material which was probably used to deliver food and water supplies to the upper portions of the plant in its younger days. The dried pith is very attractive to parakeets, who love to peck it out and sometimes fashion the interior of the stalk into a hollow nest. When provided with such a toy in a birdcage, the parakeets amuse themselves for about two weeks, during which time the birds are visibly, very happy compared to the sad, depressed days before the project.

The parakeet nesting facility would ordinarily be cylindrical, and is capped at both ends, preferably with a plastic dip material, either cold set or hard set, which defines outer limit edges of the log member which are soft and smooth to prevent scraping the bird or the bird's owner.

The bird would ordinarily remove a major portion of the pith in the shell, and if it is so inclined, use the plucked-out pith as bedding material, fashioning a nest for itself and the family that it will probably never have. Nonetheless, during the nest building period while the parakeet is fantasizing about the rewards of parenthood, it will be quite cheerful, as reflected not only in its attitude but its persistent good health and well-groomed appearance as well.

BRIEF DESCRIPTION OF THE DRAWINGS

FIG. 1 is a top parallel perspective of the nesting facility;

FIG. 2 is a section taken vertically through the cylindrical nesting facility illustrating the position of a bird in phantom and the nest it has made inside the log;

FIG. 3 is a rear elevation view of the housing illustrating the cage hooks and the circular opening cut into the shell to get the parakeet started;

FIG. 4 is a section taken along line 4—4 of FIG. 2; and,

FIG. 5 is a section taken along line 5—5 of FIG. 2.

DETAILED DESCRIPTION OF THE PREFERRED EMBODIMENT

The parakeet facility is shown at 10 and comprises a simple cylindrical log 12 which has endcaps 14 and 16 on the top and bottom, respectively. On the back are hooks 18 for mounting on the wire mesh side of a cage. The log is about 8 inches tall and 3 inches wide, and a parakeet, which ordinarily measures about 2 inches tall in its sock feet, stands on the longer expanse of the log alongside the opening 20 and pecks away at the pith. Once the opening is large enough to let the bird through, it enters the log through an opening which is shown as circular, but could also be oval or squared-off as wall. The log consists of a hard outer shell 22 and a soft interior made up of pith 24.

The log could be a section of an agave plant flower stalk which has this configuration naturally, or it could be fabricated to substantially simulate the Agave stalk configuration with a plastic, bamboo or other hard-shell material forming the outer shell, and cellulose or any fibrous material, natural or synthetic, used to fill the interior. The loose filler would have to be in a matrix of some type, preferably with a grain direction parallel to the log, rather than actually being loose, as the purpose is to provide pecking and shredding entertainment to the parakeet for up to several months, and not the instant gratification of an immediate new hollow. The circular opening may cut into the pith slightly, but its purpose is not to penetrate the pith at all, as that is the bird's job, but merely to provide access to the interior for the parakeet.

Once the bird catches on to the nature of the pith, it begins pulling it out in shreds, making a larger and larger hollow as shown at 26, and lining the hollow with loose pith 28. Once complete, there are certain bird toys for the kids that can be attached to the walls of the hollow as indicated at 30 in FIG. 2. These toys can be attached to the pith with a serrated pin or the like which will not easily pull out and endanger the bird. The parakeet plans on raising a family in the hollow, though the owner's zoning laws limit parakeets to one per hollow. But the bird keeps thinking if it does a good enough job, maybe the owner will get twin logs and re-zone for families.

It is hereby claimed:

1. A parakeet amusement apparatus comprising:
   (a) a substantially solid log comprising a cut length of a dry bloom stalk of an Agave Americanus plant, said cut length being of diameter on the order of half again the vertical height of a standing parakeet and being characterized by having:
      (i) a hard outer shell; and,
      (ii) a pithy interior matrix occupying the space inside said shell and being integral therewith, said pithy interior matrix being softer than said shell and of texture such that a parakeet is able to peck it away;
   (b) an end cap covering each end of said log;
   (c) an opening cut through said shell to provide access to said pithy interior matrix; and,
   (d) support means for supposing said log substantially horizontally in a parakeet cage with said opening disposed on the top side thereof such as to permit a parakeet to perch on said log while pecking a said pithy material through said opening.

2. A parakeet amusement apparatus according to claim 1 wherein said support means comprise cage hooks to attach said log to a bird cage side wall and said end caps are smoothly contoured and of elastomeric material to minimize the risk of injury to a bird occupying said cage.

3. A parakeet amusement apparatus according to claim 2 wherein said end caps are solidified liquid plastic into which said ends were dipped.

4. A parakeet amusement apparatus according to claim 2 wherein said opening is substantially circular and said log substantially defines a cylinder on the order of twice the diameter of said opening and said opening is closer to one end of said log than the other to define a perchable area between said opening and said other end so that the bird can perch on the shell alongside the opening to peck away at said matrix through said opening.

5. A facility according to claim 1 wherein a substantial portion of said matrix has been removed and including a plurality of parakeet entertainment toys and means mounting same inside said log to the inside side wall of a hollow made by a parakeet.

* * * * *

UNITED STATES PATENT AND TRADEMARK OFFICE
CERTIFICATE OF CORRECTION

PATENT NO. : 5,423,290

DATED : June 13, 1995

INVENTOR(S) : Payne

It is certified that error appears in the above-indentified patent and that said Letters Patent is hereby corrected as shown below:

Column 1, line 57, "Agave Americanus plant" should read--plant of the genus 'Agave'--.

Signed and Sealed this

Second Day of January, 1996

Attest:

BRUCE LEHMAN

*Attesting Officer*  *Commissioner of Patents and Trademarks*